May 16, 1950     A. C. REESIDE     2,508,296
MEASURING DEVICE

Filed Sept. 9, 1944     3 Sheets-Sheet 1

Inventor:
ARTHUR C. REESIDE,
by John E. Jackson
his Attorney,

May 16, 1950     A. C. REESIDE     2,508,296
MEASURING DEVICE
Filed Sept. 9, 1944     3 Sheets-Sheet 2
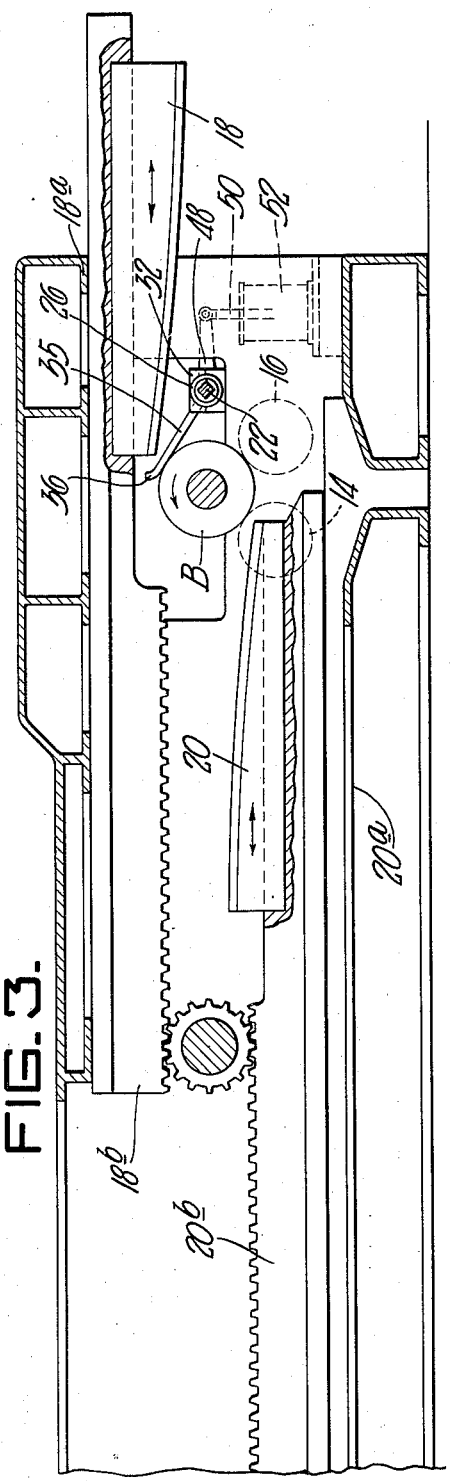
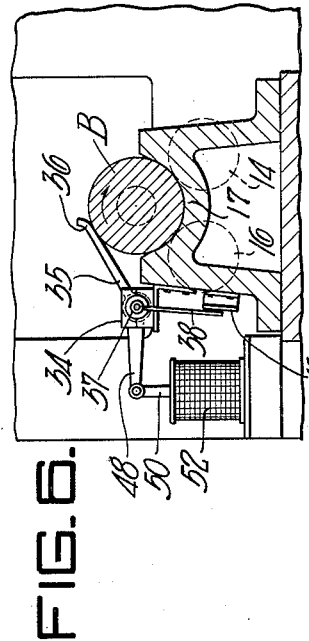
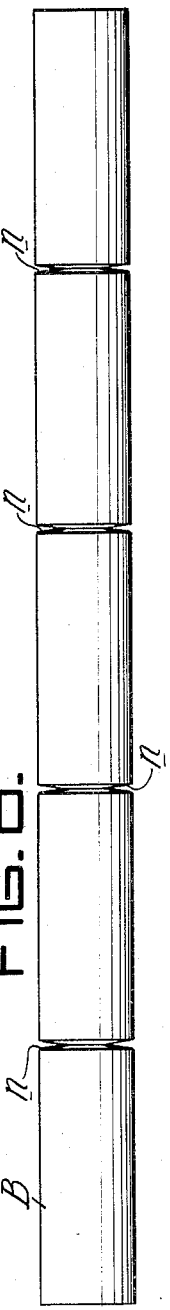
Inventor:
ARTHUR C. REESIDE,
by John E. Jackson
his Attorney.

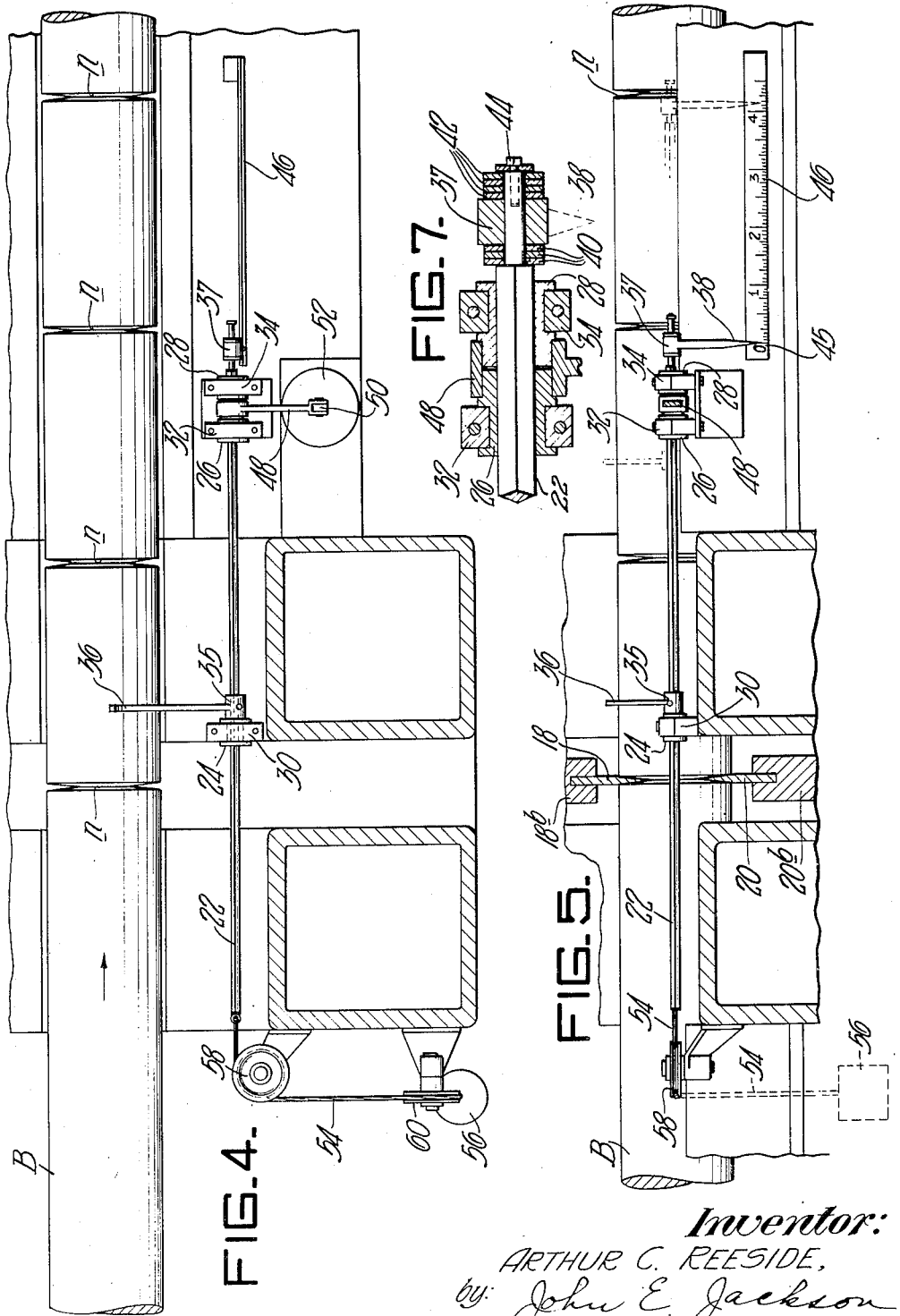

Patented May 16, 1950

2,508,296

UNITED STATES PATENT OFFICE 2,508,296

MEASURING DEVICE

Arthur C. Reeside, Homestead, Pa.

Application September 9, 1944, Serial No. 553,404

3 Claims. (Cl. 80—1)

The present invention relates to a measuring device particularly adapted for indicating with precision the distance between nicks formed in a bloom or similar elongated round body.

In the production of rolled steel car wheels it is customary to form annular nicks in the bloom at spaced joints and to break it at the nicks so as to permit examination of the grain structure at the plane of fracture. Heretofore the measurement of each individual blank, as determined by the space between the nicks in the bloom, was indicated to the operator of the nicking or cutting-off machine by means connected by links and gear mechanism with a dial indicator, movement being transmitted to this mechanism by the pusher which propelled the bloom along a suitable work-supporting table. Due to the lost motion in the link and gear mechanism and also to the fact that after each nicking operation the bloom would not stop in the same position and the pusher would not come to rest at the same point at the end of each stroke, the net result was the production of blanks of incorrect measurement, which caused the production of off-weight wheel blanks, the error sometimes amounting to as much as 90 to 100 pounds. Such inaccuracies resulted in failure to meet practical requirements as to weight tolerances which usually call for an accuracy within ten pounds. Hence a considerable amount of production was rejected.

The chief object of the present invention is to overcome difficulties inherent in prior art mechanisms for indicating the length between nicks of a bloom or similar elongated body.

The invention will be more fully apparent from consideration of the following detailed disclosure, the accompanying drawings, and the appended claims.

In the drawings:

Figure 3 is a transverse section on line III—III of Figure 2.

Figure 4 is an enlarged skeleton plan illustrative of the improved measuring device of the present invention and illustrates in detail mechanism for restoring the pointer of the measuring device to zero or starting position.

Figure 5 is a side elevation of the parts shown in Figure 4.

Figure 6 is a section on line VI—VI of Figure 5, showing the coaction of part of the improved mechanism with the nicked bloom.

Figure 7 is a fragmentary detail section.

Figure 8 is a side elevation of a nicked bloom showing the spaced nicks whose distances apart are adapted to be measured and controlled by the device of the present invention.

Figure 1:
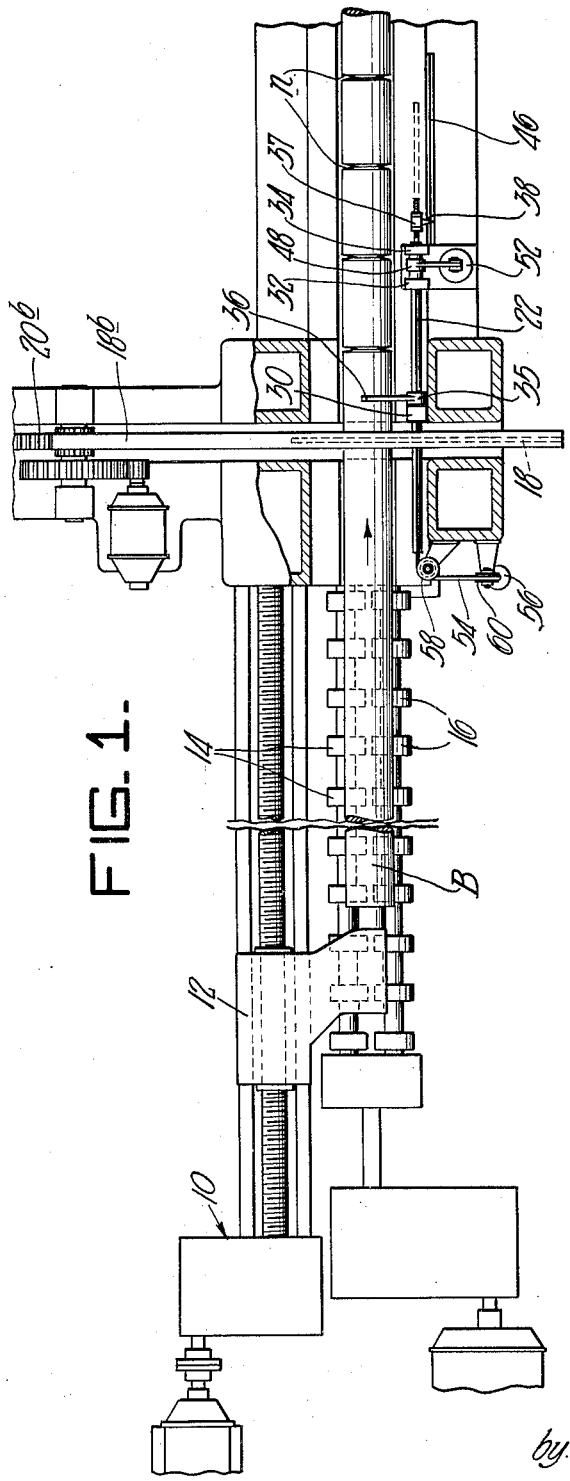
Figure 1 is a somewhat diagrammatic plan of a conventional form of nicking machine showing the adaptation of my improved measuring means thereto.

Referring in detail to the drawings, reference numeral 10 represents the pusher of a well known type of cut-off machine. This pusher is actuated by a conventional mechanism, indicated diagrammatically at 12, which is effective to advance a bloom B axially along suitable supporting means such as indicated by the rollers 14 and 16 and guide trough 17. Horizontally reciprocating top and bottom knives 18 and 20 respectively, of known or conventional form, are mounted in suitable guides 18ᵃ and 20ᵃ and actuated in a conventional manner by knife-reciprocating mechanisms 18ᵇ and 20ᵇ. As the knives move inwardly they engage the upper and lower portions of the bloom B and thus exert a force effective to rotate the bloom and simultaneously form an annular nick therein.

Figure 8 illustrates a bloom having several annular nicks therein, as indicated at n. The distance between adjacent nicks determines the length of bloom stock which when broken off between the nicks constitutes a given wheel blank. In practice, a given bloom may range from 16 to 19 feet in length, and of a diameter of from 15 to 17½ inches. The nicking operations performed by the knives are adapted to form individual wheel blanks varying in length from approximately 8 inches to 22 inches, depending upon the type of wheel to be made and to customers' specifications.

The present invention provides precision means for enabling the pusher machine operator to accurately determine and control the measurement between adjacent nicks. Such accuracy is made possible by the provision of mechanism shown particularly in Figures 4 to 7 inclusive, which mechanism includes an element making direct physical contact with a nick in the moving bloom so as to avoid errors in measurement such as occur when the indicating means are responsive to movement of the parts which propel the bloom. My improved measuring device includes a square shaft 22 which is slidable in suitable bushings 24, 26 and 28, which are rotatably mounted in bearings 30, 32 and 34 respectively. Fixedly secured to the shaft 22 there is an arm 35 the free end portion 36 of which is adapted to ride the outer face of the bloom until it engages a nick in the bloom after which engagement, movement of the bloom will be transmitted to the square shaft 22. One extremity of the shaft 22 is turned down to cylindrical form and the hub 37 of a pointer 38 is rotatably supported by said cylindrical portion 36. Washers 40 and 42 are mounted adjacent the opposite ends of the hub 37, and a screw 44 serves to confine the hub of the pointer on the cylindrical end of the shaft. As thus arranged, one or more of the washers 40 or 42 can be added or removed so as to initially set the pointer 38 to the zero position indicated at 45 on a scale 46 which is fixedly mounted on any suitable support in juxtaposition to the line of travel of the bloom.

A lever 48 is slidably mounted on the shaft 22 between the fixed bearings 32 and 34. Thus this lever will not partake of the longitudinal movement of the square shaft 22 since the latter slides through the hub of the lever. The movable core 50 of a solenoid 52 is operatively connected to the free end of the lever 48. When the solenoid is momentarily energized under manual control of an operator, it rocks the shaft 22 clockwise as viewed in Figure 3 to disengage or lift the end of the arm 35 from the nick $n$ which has been previously formed in the face of the bloom by the knives 18 and 20, and when the solenoid is deenergized the weight of the arm 35 is sufficient to cause the outer end thereof to ride the face of the advancing bloom so that its extremity 36 will drop by gravity into the annular nick formed therein by the knives 18 and 20.

Figure 2:
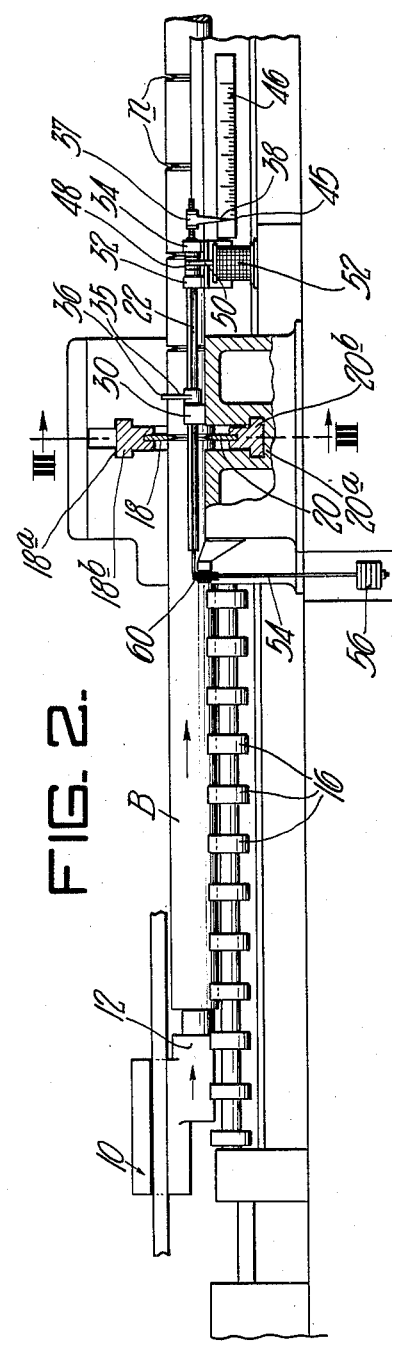
Figure 2 is a side elevation of Figure 1.

For example, as viewed in Figures 1 and 2, assuming the solenoid to be normally deenergized, the bloom will move a distance equal to that between the vertical plane of the left-most nick, that is the one coincident with the knives 18 and 20, or line III—III, without moving either the shaft 22 or the pointer 38, which latter is then at zero position. When said left-most nick reaches the plane of arm 36, as shown in Figure 2, the extremity of the arm will drop into that nick and from that time on the movement of the bloom will be transmitted to the pointer.

At the start of the cycle of operation, the arm 35 and pointer 38 occupy the positions shown in Figures 2 and 5. The shaft 22 is returned to this position upon energization of the solenoid 52 by means of a cable 54 and weight 56, the cable being trained around guide sheaves 58 and 60. In the normal operation of the apparatus shown and described there is provided at a suitable operating station (not shown) conventional controls for the pusher mechanism 10, knives 18 and 20 and for the solenoid 52 of the measuring device. The pusher slowly moves the bloom along the support formed by the rolls 14 and 16 and trough 17 until the arm 35 comes to a nick in the bloom. Thereupon the extremity 36 of the arm falls into the nick and thereafter the square shaft 22 partakes of the advancing movement of the bloom, the pointer 38 at this time traversing the fixed scale 46 and thus showing with precision the exact distance traveled by the bloom from the instant the end of the arm dropped into a nick. When the pointer 38 reaches the predetermined point on the scale 46 corresponding to the desired distance between nicks (which corresponds to the desired length of a wheel blank) the operator causes the stoppage of the pusher mechanism 12. The knives 18 and 20 are then operated to form another nick in the bloom. Thus this second nick is indented at an accurately determined distance from a previously formed nick. Thereupon the solenoid 52 is momentarily energized, thus rocking the lever 48 and turning the shaft 22 a sufficient distance to lift the free end 36 of the arm 35 out of the nick, whereupon the weight 56 will cause the shaft 22 to be retracted to the starting position of Figures 2 and 5, the retractive movement of the shaft being arrested by the hub of arm 35 coming to rest against the bushing 24 carried by the fixed bearing 30. At this time the pointer 38 will also come to rest at the zero position. The parts are thus restored to starting position, ready to repeat the described cycle for the next nicking operation.

Reduction to practice has demonstrated that the described measuring device has overcome bothersome problems inherent in indicating mechanisms of prior art machines, and the invention has resulted in a considerable increase in efficiency in the manufacture of wheel blanks through minimizing the rejection of blanks due to incorrect weights. In prior art mechanisms the weights of individual wheel blanks in practice have varied by as much as 90 to 100 pounds, whereas the percentage of rejection since the use of my herein described invention has been considerably cut down and weight variations of individual blanks have been reduced to the negligible amounts, with the attendant conservation of labor and critical materials through reducing to a minimum the rejection of wheel blanks used in the forging or rolling of wheels.

While I have described quite precisely a preferred embodiment of the invention which an actual reduction to practice has demonstrated to be highly desirable, it is not to be construed that I am limited thereto, since various modifications may be made by those skilled in the art without departure from the invention as described in the appended claims.

I claim:

1. Apparatus of the character described, including a pusher for longitudinally advancing an elongated billet-like body having a nick therein, means for indicating with precision the distance said elongated body is advanced by said pusher comprising a fixed scale, a pointer traveling along the scale, a slidably mounted shaft supporting the pointer, an arm on the shaft engageable with the said nick in the body whereby movement of the body is imparted to said shaft and pointer, means for disengaging the arm from the nick to thus break the driving connection between the shaft and the body, and means for retracting said shaft and the pointer to a fixed starting position upon disengagement of the arm from the nick so as to return the pointer to the zero starting position on said scale.

2. In apparatus for nicking an elongated billet-like metallic body whereby said body can subsequently be broken into pieces, the length of which are determined by the distance between nicks, the combination comprising supporting means for an elongated body, pusher mechanism adapted to longitudinally advance said body variable distances under manual control of an operator, a measuring scale fixedly mounted in juxtaposition to the line of travel of the body, an indicating pointer adapted to traverse said scale, a shaft on which said pointer is rotatably supported, spaced fixed bearings slidably and rotatably supporting said shaft, a member secured to said shaft having a portion adapted to engage a nick in said body so as to transmit the longitudinal movement of the body to said shaft and the pointer carried thereby, means for rocking said shaft to thus disengage said member from the nick, and means for retracting said shaft and the pointer thereon to starting position upon disengagement of said member from the nick in said body.

3. Apparatus of the character described, comprising bloom-supporting means, a pusher adapted to advance a bloom variable distances along the supporting means under manual control of an operator, knives traveling transverse to the line of travel of the bloom effective to nick the bloom, a fixed scale mounted in juxtaposition to the line of travel of the bloom, a pointer secured to a shaft slidably mounted adjacent said scale, a member secured to said shaft having a portion adapted to engage a nick in the bloom made by said knives so as to transmit the longitudinal movement of the bloom to said shaft and pointer, manually controlled means for rocking said shaft to disengage said member from said nick when the pointer reaches a predetermined point on said scale, and means for retracting said shaft and the pointer thereon to starting position upon disengagement of said member from the nick in said body.

ARTHUR C. REESIDE.

REFERENCES CITED

The following references are of record in the file of this patent:

UNITED STATES PATENTS

| Number | Name | Date |
|---|---|---|
| 1,681,306 | Moon | Aug. 21, 1928 |

FOREIGN PATENTS

| Number | Country | Date |
|---|---|---|
| 518,718 | Germany | Feb. 19, 1931 |